Nov. 10, 1925.
E. P. STEVENS
1,560,618
BRICK TREATING APPARATUS
Filed Oct. 26, 1922     3 Sheets-Sheet 1
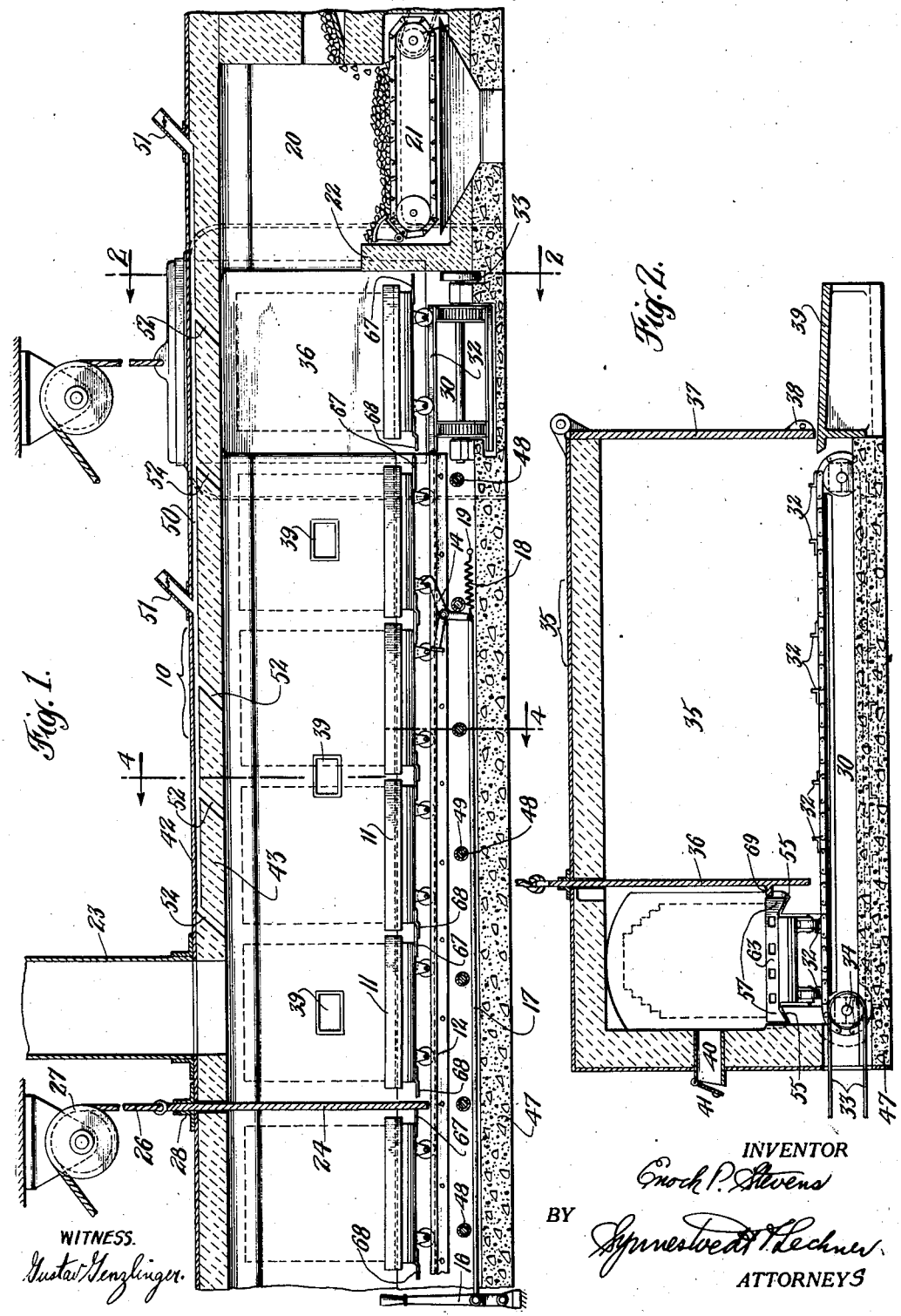
INVENTOR
Enoch P. Stevens
BY
Synnestvedt & Lechner
ATTORNEYS
WITNESS.
Gustav Genzlinger.

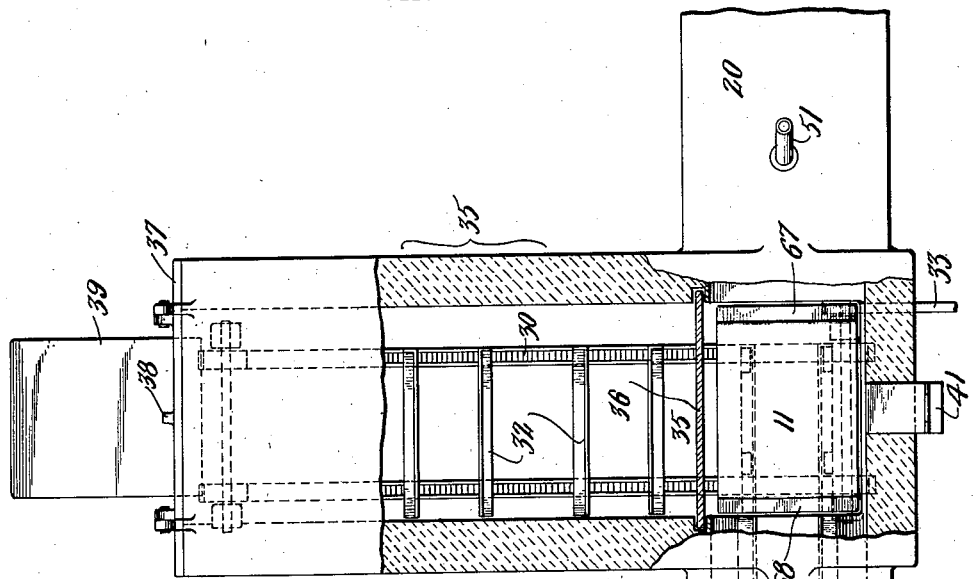

Patented Nov. 10, 1925.

1,560,618

UNITED STATES PATENT OFFICE.

ENOCH P. STEVENS, OF CHICAGO, ILLINOIS; MARY ANN STEVENS, EXECUTRIX OF SAID ENOCH P. STEVENS, DECEASED.

BRICK-TREATING APPARATUS.

Application filed October 26, 1922. Serial No. 596,927.

*To all whom it may concern:*

Be it known that I, ENOCH P. STEVENS, a citizen of the United States, residing at Chicago, in the county of Cook and State of Illinois, have invented certain new and useful Improvements in Brick-Treating Apparatus, of which the following is a specification.

My invention relates to treating apparatus for the manufacture of earth products, such as brick, and particularly fire brick, and is especially concerned with apparatus for drying or baking such brick. I aim to provide for continuous operation, and for turning out the finished product as rapidly, conveniently, and economically as possible; and, in general, to realize the advantages of continuous manufacture in quantity.

How these and other advantages can be realized through the invention will appear from my description hereinafter of the best embodiment of the invention known to me.

In the drawings, Fig. 1 shows a vertical longitudinal section through apparatus of "tunnel" type conveniently embodying my invention, and adapted for baking or burning brick.

Fig. 2 shows a vertical section at right angles to Fig. 1, taken lengthwise of a discharge tunnel extending laterally from the main heating tunnel, as indicated by the line 2—2 of Fig. 1.

Fig. 3 is a general plan view of the apparatus, partly in horizontal section.

Figure 4:
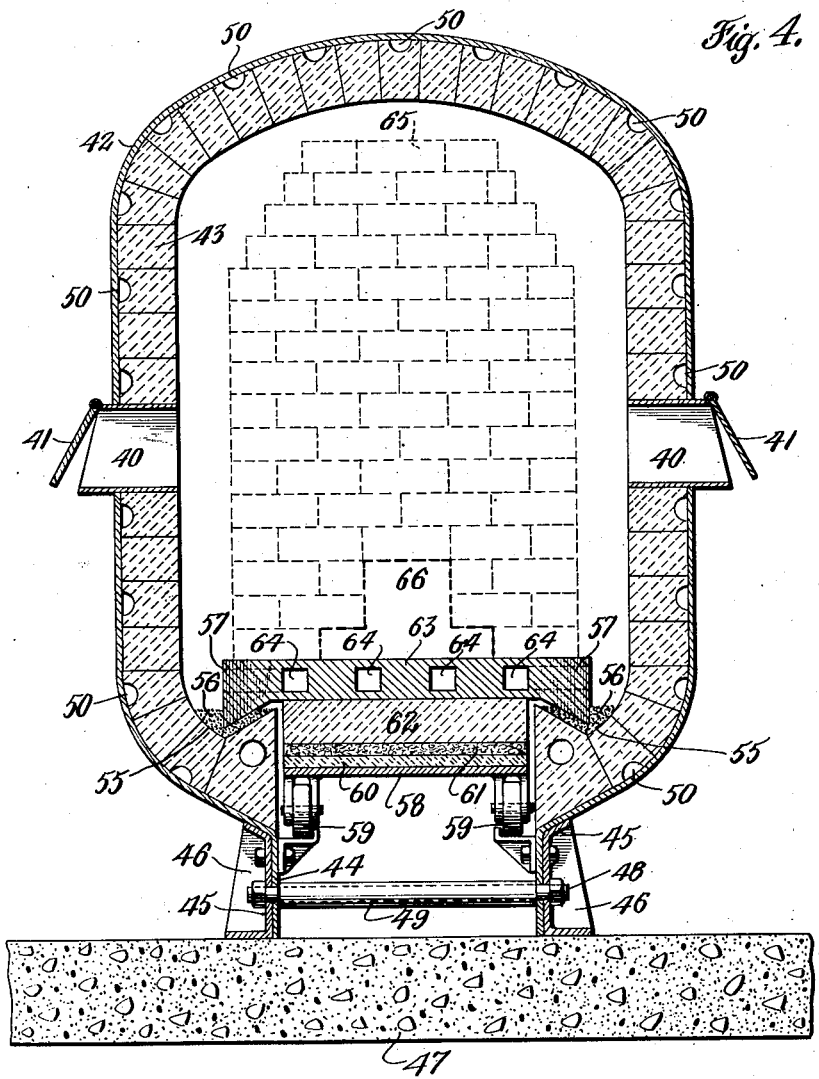
Fig. 4 shows a cross section through the main tunnel, taken as indicated by the line 4—4 in Fig. 1, on a larger scale.

Referring to the drawings generally, it will be seen that the apparatus shown comprises a long tunnel 10 through which the brick to be heated travel in one direction on suitable carriers or conveying means, such as flat cars or trucks 11 running on track or rails 12, against a counterflow of heating medium from a source suitably remote from the tunnel entrance. In practice, the tunnel 10 may advantageously be as much as 150 or 200 feet long, or more, and some six feet high inside. As shown, the track 12 may slope gradually downward from the entrance end of the tunnel 10 at a suitable grade (say 5%), so as to feed the loaded cars 11 through by gravity, and stop means may be provided for regulating and controlling their progress. The stop means illustrated comprises a pivoted trigger or trip device 14 arranged between the rails 12 for engaging the rear axle of the next to the front car 11, and operable by a hand lever 16 at the entrance of the tunnel through a link-rod connection 17. When the trip 14 is shifted to release a car, it is held "out" until the whole string of cars has advanced by gravity about half a car length, and then returned in time to engage the rear axle of the next car and hold the string of cars until the time comes for the next forward feed. Normally, the mechanism is kept in position for the trip 14 to engage, as by means of a helical tension spring 18 connected between said trip and a fixed anchorage 19. Thus the cars may be intermittently advanced any desired amount (say one car length), according to the operation of the trip device.

The source of heating medium here shown is in the opposite end of the tunnel 10 from the entrance, in the form of a furnace 20 provided with automatic chain grate and stoking devices, etc., comprehensively indicated at 21. The hot gases and products of combustion from this furnace 20 pass over its bridge wall 22 (that extends across the tunnel 10) and travel on rearward, counter to the series of advancing cars 11, to a stack 23 in the tunnel roof, just in front or inside of the vertically sliding refractory entrance gate 24. This gate 24 is normally closed, as shown, so as to prevent loss of draft on the fire and annoyance to the workmen by the escape of furnace gases through the tunnel entrance, and is only opened at intervals to admit a fresh car 11 when the whole series of cars is to be fed forward. On such occasions, the gate 24 may be drawn up (as by means of cable 26 passing over pulley 27) through a slot in the furnace roof that is provided with antileakage devices 28.

As each car 11 is released by the front trip 14, it travels along from the rails 12 on to conveyor means 30 of sprocket chain belt type (shown as provided with transverse track or rails 32 for taking the cars from the tunnel rails 12) that may be appropriately driven, during the intervals of rest of the cars 11 on the rails 12, by means of a belt and pulley connection 33 to one of the sprocket wheel shafts 34. By this conveyor 30 the cars are discharged laterally from the tracks 12, through a tunnel 35 opening and extending laterally from the heating tunnel 10 just in front of the bridge wall 22 and the furnace 20. At the entrance to this discharge tunnel 35 is a vertically sliding refractory gate 36 mounted, arranged, and operable like the gate 24. This gate 36 is normally closed, but is periodically opened each time the trip 14 is released, and allowed to remain open long enough for the car that then rolls on to the conveyor 30 to be carried past the gate. In order to minimize loss of heat at this end of the tunnel 10 (which is the hottest) by leakage past the gate 36, or when this gate is open, the delivery end of the lateral tunnel 35 may be provided with a self-closing swinging gate 37 that will yield to a car pushed against it by the conveyor 30, and can be opened by engagement of a hook or the like with its pierced lug 38, to permit such car to be pulled out on to a convenient platform 39. Each car 11 may advantageously be allowed to remain in the tunnel or chamber 35 a considerable time, to allow its charge of bricks to cool or anneal gradually before it is brought out into the cold outer air; and the generally closed door 37 serves to maintain a suitable temperature for this purpose in said chamber. Openings 40 through the walls of the heating tunnel 10 at suitable intervals allow the charges of brick on the cars 11 to be inspected from time to time. As shown, these openings are provided with self-closing swinging covers or dampers 41.

Referring, now, more especially to Figs. 1 and 4, it will be seen that the tunnel 10 is above ground and is shown as of composite construction, comprising an outer steel wall or shell 42 with a lining 43 of highly refractory fire brick. In the bottom of the composite tunnel wall is a gap extending its entire length, and affording a space or trackway for the cars 11. The rails 12 in this trackway are mounted and supported on downturned lower portions 44 of the metal wall 42, being of Z-bar form with their lower flanges bolted against the wall portions 44. In the construction illustrated, the entire weight of the whole structure rests on the lower wall portions 44, which are reinforced and stiffened with external longitudinal channels 45, themselves provided at intervals with transverse stiffening webs 46. The lower flanges of the channels 45 rest as feet on the concrete floor or foundation 47, while their inclined upper flanges engage and stiffen the bend by which the tunnel shell merges into the portions 44. These portions 44 are accurately spaced and braced together by means of tie rods 48 bolted through them, and provided with spacer sleeves 49.

Provision may be made for supplying or admitting supplemental air for "secondary" combustion in the tunnel 10, beyond the furnace chamber 20. As shown in Figs. 1 and 4, there are numerous longitudinal channels or passages 50 in the composite tunnel wall just inside the metal shell 42, formed by grooves in the exterior surfaces of the brick of the refractory lining 43. Such of these air channels 50 as are to be used (as shown, the very top one in the tunnel roof) are supplied with air by one or more openings through the shell 42 at suitable points or intervals, such as the damper-controlled and regulable admission pipes 51 shown in Figs. 1 and 3. From the channels 50 so supplied, the air is admitted to the interior of the tunnel through ports or passages 52 located at suitable points or intervals, and here shown as extending diagonally through the lining 43 in the direction of flow of the combustion gases discharged into the tunnel by the furnace 20. The secondary combustion permitted by the supply of supplemental air helps to keep up the temperature of the gases in the tunnel, or in other words, affords heat regeneration for them. The dead air in the channels 50 not in use affords the tunnel walls some additional thermal insulation.

In the refractory tunnel lining 43, alongside the trackway gap, are sealing channels or grooves 55, containing sealing material such as sand 56. The bottoms or platforms of the flat cars 11 substantially fill and close the trackway gap, and project or overhang laterally at 57 for sealing engagement with the sand 56, extending downward somewhat into the channels 55. Each of them comprises a metal plate 58 above the wheels 59, surmounted by a refractory and thermally or nonconductive lining composed of successive layers of brick 60, asbestos 61, and fire brick 62. This refractory lining serves as backing for a top facing 63, preferably of thermally conductive material such as iron or steel and provided with horizontal heating flues 64 extending lengthwise of car and tunnel. As shown, it is this top facing 63 that overhangs (as already described) for sealing engagement in the subjacent channels 55. In conjunction with the nonconductive backings, the conductive flued tops 63 serve to prevent or minimize chilling of the superjacent charges of brick 65, being kept hot by passage of gases in the tunnel through the flues. For the like purpose, the charges 65 may be piled with longitudinal passages 66 therein along the tops 63, preferably formed by the self-arching of the piled brick. These passages 66 not only serve as additional heating flues for the charges 65 and the tops 63, but also minimize the area of contact of the piles with the tops 63 and the consequent loss of heat from the bricks by conduction. As shown, each of the car bottoms or platforms is provided with correlative end flanges 67, 68 adapted to overlap and seal with corresponding end flanges on the other cars, so as to minimize loss of heat by leakage of the gases downward between the cars. At the entrance to the lateral discharge tunnel 35, where the corresponding sealing channel 55 is interrupted, the refractory discharge gate 36 is provided with a lateral ledge or flange 69 adapted to engage (or nearly touch) edgewise the corresponding car bottom overhangs 57.

Thus, it will be seen, transmission of heat and gases downward into the trackway are minimized, and the rails 12, car wheels 59, etc., are, therefore, adequately cooled by the free radiation from the channels 44 and their webs 45, unchecked by any refractory wall or lining.

What I claim is:

1. Apparatus of the character described comprising a heating tunnel for loaded cars with means for maintaining a flow of heating medium therethrough; and a discharge and cooling chamber for the cars opening laterally from said tunnel at its hotter end.

2. Apparatus of the character described comprising a heating tunnel with a track therein for loaded cars; a source of heat at one end of said tunnel; and a discharge tunnel with conveyor means for taking the cars from said track extending laterally from said first tunnel in front of said source of heat.

3. Apparatus of the character described comprising a heating tunnel for loaded cars; a bridge wall across said tunnel at one end, with a heating furnace therebeyond; a cooling tunnel for the cars extending laterally from said first tunnel from in front of said bridge wall, and a gate controlled discharge opening for the cars in the cooling tunnel.

4. Apparatus of the character described comprising a heating tunnel with a track therein for loaded cars, and means for maintaining a flow of heating medium therethrough; and conveyor means, with transverse tracks to take the cars, for discharging the cars sidewise in a lateral direction from said first tracks after travel therealong counter to the flow of heating medium as aforesaid.

5. Apparatus of the character described comprising a tunnel with entrance gate for loaded cars at one end and a heating furnace at the other end, and discharge for furnace gases adjacent and inside of said gate; a track for the cars in said tunnel inclined downward toward said furnace; a discharge tunnel, with conveyor means for the cars and an entrance gate, extending laterally from said first tunnel in front of said furnace; and means for releasably engaging and holding back the cars on said inclined track.

6. Apparatus of the character described comprising a refractory-lined, metal-walled heating tunnel with a gap in its bottom to afford a trackway, sealing troughs in the lining alongside said gap, and tracks in said trackway supported from the wall alongside the same; and cars for said trackway and tracks with bottoms closing the gap of the tunnel lining and projecting laterally for sealing engagement in said channels, the car bottoms having conductive top facings with longitudinal heating passages, refractory backings for said facings, and end flanges beneath said passages overlapping to seal the intervals between the car bottoms.

7. A refractory-lined metal-walled heating tunnel with a gap in its bottom to afford a trackway, sealing channels in the lining alongside said gap, and tracks in said trackway attached to the metal wall at the sides of said gap.

8. A refractory lined metal walled heating tunnel with a gap in its bottom to afford a trackway and tracks in said trackway attached to the metal wall at the sides of said gap.

9. Brick treating apparatus of the character described comprising a refractory-lined metal walled heating tunnel with longitudinal air supply channel inside the shell, in the exterior of the lining, and an air supply passage from said channel through the lining into the interior of the tunnel; and means for maintaining a flow of combustion gases through said tunnel.

In testimony whereof, I have hereunto signed my name.

ENOCH P. STEVENS.